3,271,230
BONDED PLASTIC SEGMENTS
Robert J. Johnson, Chicago, and Thomas W. Findley, La Grange, Ill., assignors to Swift & Company, Chicago, Ill., a corporation of Illinois
No Drawing. Filed Sept. 4, 1962, Ser. No. 221,359
14 Claims. (Cl. 161—184)

This invention relates to the manufacture of bonded plastic segments and to the process of bonding such plastics. More particularly, the invention concerns laminating sheets of nylon plastic and bonding nylon adherents.

Nylon has found extensive use in the plastic industry. As a result of the increasingly widespread use of all forms of nylon in industrial production, a commercial adhesive capable of bonding nylon to nylon would be most advantageous. However, at the present time there appears to be no commercial adhesive capable of bonding nylon to nylon to give an adhesive bond comparable in strength to that of nylon itself.

A wide variety of mechanical parts are now made from nylon in place of metal. For example, gears, rollers, wheels, slides, panels, pulleys, trolleys, hooks, etc., found in equipment used in the paper, textile, artificial leather, meat industries, etc., are being made from nylon. The excellent abrasion resistance of nylon in the absence of lubrication enables one to substitute this plastic for metal when frequent oiling is inconvenient or undesirable. Furthermore, nylon has been used where the particular article must have good impact resistance. For example, nylon has been used in the door-closing mechanisms found in automobiles and refrigerators, and as soft-faced hammers and bowling pins. Notwithstanding the unique properties of nylon (toughness, resilience, abrasion and wear resistance, etc.), there comes a time when a particular article breaks and must be repaired.

Laminates of nylon, both for decorative and industrial uses, are another example requiring a satisfactory adhesive. Laminates are of particular interest to designers since they afford them an opportunity to make use of many intricate or unusual shapes. Laminates are particularly adaptable to intricate shapes or parts requiring great mechanical strength and wear properties. Laminates are also useful when the final object is to be of different colors. Similar to laminating is the process of making an object in two halves and subsequently joining them. For example, it is possible to injection-mold a bottle in two halves and join them together with an adhesive.

It is therefore apparent that a commercial adhesive capable of bonding nylon to nylon to give an adhesive bond comparable in strength to that of nylon itself is most desirable.

Accordingly, it is an object of this invention to produce satisfactorily bonded nylon segments.

It is also an object of this invention to manufacture satisfactory nylon laminates by using a specific type of adhesive.

A further object of this invention is to provide a process for uniting nylon segments.

A still further object is to provide a process for bonding nylon parts which have been intentionally made separately.

Additional objects, if not specifically set forth herein, will be readily apparent to those skilled in the art from the detailed description of the invention which follows:

In general, this invention comprises applying to the surface of nylon articles a polymerizable adhesive comprising a nonterminal epoxy material, a lactam and a polyamine, followed by mating the coated articles at the adhesive phases. Also contemplated are laminates of nylon which can be subsequently cut, machined, etc., if desired. The nylon articles, which are to be bonded by means of this invention consist of the polyamide type. Basically, these nylons are polymeric resins formed by the condensation of dibasic organic acids with diamines into linear chains containing amide groups. Also included are the nylons made by opening the ring of a lactam. Specific nylons include nylon 6/6 formed by the reaction of hexamethylenediamine and adipic acid, nylon 6 formed by the polymerization of caprolactam, nylon 6/10 formed by condensing hexamethylenediamine with sebacic acid and nylon 11 produced by the polymerization of 11-amino undecanoic acid.

More specifically, the adhesive used in this invention comprises a polymeric resin of oxirane-containing higher fatty acid esters of di- and polyhydric alcohols, oxirane-containing higher fatty alcohol esters of di- and polybasic acids, and oxirane-containing fatty acid amides of polyamines with a lactam and a polyamine. The adhesive compositions are easily prepared by bringing together the oxirane-containing reactant, the lactam and the polyamine and heating until a reaction between the oxirane group of the fatty material and the lactam is effected. The polyamine serves a dual function, being a reactant and an accelerator.

Suitable lactams utilized in this invention include those organic ring compounds containing in the ring the

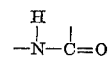

group. Such lactams can be derived from amino carboxylic acid by the elimination of water. Included are the gamma lactams such as gamma butyrolactam, delta lactams such as delta valerolactams, delta caprolactam and epsilon lactams, such as epsilon caprolactam. The aminocarboxylic acids used in forming the lactams can be straight and branch chained and can also contain nonreactive functional groups. Straight chain amino acids are preferred and lactams having 4–10 carbons are the most suitable. Higher lactams are also suitable but the lower ones are preferred. Caprolactam, being commercially available is the preferred lactam reactant.

Oxirane-containing higher fatty compositions which can be employed in the formation of the polymeric adhesive resin include oxirane substituted higher fatty acid esters, oxirane substituted higher alcohol esters, and oxirane substituted higher fatty acid amides of polyamines. Generally these materials have in the structure thereof at least one long chain (8–22 carbons) radical which is substituted one to four times with oxirane-containing groups. The oxirane-containing reactant must have a total of at least four epoxy groups per molecule. Of course the epoxy groups may be present on the same or different long chain radical as long as the oxirane-containing reactant has a total of at least 4 epoxy groups.

The epoxy reactants contemplated herein are not to be confused with the epoxy resins which are generally produced by the reaction of epihalohydrins and phenols and having the oxirane groups on terminal carbons in the polymer. The epoxy fatty materials used in this invention are characterized as having internal epoxy groups. Epoxy groups so situated are generally not so reactive as the terminal epoxides and the long chain found in oxirane-containing fatty materials appears to further limit reactivity.

Mono-, di-, and polyhydric aliphatic alcohol esters of oxirane-containing higher fatty acids are particularly suitable as the oxirane-containing reactant. Glyceride esters of oxirane-containing higher fatty acids are preferred inasmuch as such esters are readily available and can be obtained by expoxidation of naturally occurring animal, vegetable, and marine triglyceride wherein ethylenic unsaturation in the naturally-occurring material is converted to oxirane groups. Of course synthetic glycerides such as epoxidized trilinolein, and epoxidized trilinolenin, and mono- and diglycerides of such epoxidized fatty acids can also be used. Partially and completely epoxidized glycerides are considered within the scope of the invention with the more highly epoxidized compositions being particularly useful because of the high functionality of such compositions. Generally, the oxirane oxygen content will range between about 7-12% but of course it can be less or more than this percent depending upon the specific ethylenic compound selected to be epoxidized and the amount of epoxidation carried out.

Epoxidized cottonseed oil, epoxidized soybean oil, epoxidized linseed oil, epoxidized menhaden oil, epoxidized sardine oil and epoxidized safflower oil are a few of the many epoxidized naturally-occurring glycerides which can be used in forming the polymeric adhesive. The fatty acids derived from these naturally-occurring glycerides when esterified with lower aliphatic alcohols result in compositions which are also a desirable source of the oxirane group. Such alcohols include the glycols and polyols having up to about 12 carbon atoms. Usually the alcohols will be of up to six carbon atoms and contain up to six hydroxyl groups. Examples of alcohols which may be esterified with epoxy higher fatty acids to form suitable esters include glycol, 1,4-butanediol, 1,3-hexanediol, glycerol, erythritol, pentaerythritol, mannitol, sorbitol, 1,3-propanediol, 1,3,5-pentanetriol. Also included are the alkyl substituted alcohols such as 2-ethyl-1,3-hexanediol and the polyglycols such as diethylene glycol.

Epoxidized higher fatty alcohols of 10–22 carbons can be esterified with di- and polycarboxylic acids of up to about 10 carbons to form the oxirane-containing fatty material. The normal dicarboxylic acids are preferred when esterifying the epoxy higher alcohols. Such dicarboxylic acids include oxalic, malonic, succinic and up to and including sebacic acid. Specific esters include di-(9,10,12,13-diepoxy stearoyl) adipate, di-(9,10,12,13-diepoxy stearoyl) succinate, etc.

Also included in the oxirane-containing fatty material group are the polyamides of the epoxidized fatty acids of 10–22 carbons described above and the alkylene polyamines such as ethylene diamine, triethylenetetramine, tetrapropylene pentamine, dibutylene triamine, and trihexylene tetramine.

The polymeric adhesive resin used to bond nylon comprises a copolymer of the oxirane-containing fatty material having at least 4 oxirane groups per molecule and the lactam and additionally contains polyamino radicals. The polyamino reactant utilized in forming the copolymer can be any primary or secondary aliphatic or aromatic amine having more than one amino group. Usually the polyamine will have at least three amino groups. Alkylene polyamines of the formula

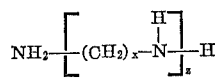

wherein $x$ and $z$ are integers of about 1 to 20 are suitable. Alkylene polyamines containing up to about 8 amino groups and having methylene to octylene groups are preferred. Specific alkylene polyamines include ethylene diamine, trimethylene tetramine, triethylenetetramine, tetraethylene pentamine, butylene diamine, tripropylene tetramine and long chain polyamines such as the N-alkyl alkylene polyamines wherein the alkyl substitution comprises a long chain alkyl group of 10–22 carbon atoms.

Aromatic polyamines include o-phenylene diamine, m-phenylene diamine, o-tolidine, 2,2'-tolidine, 2,4-toluylene diamine, 1,4-diamino naphthalene, and other polyamines free of interfering substituents.

In the manufacture of the adhesive, the oxirane-substituted material, lactam and polyamine are mixed and heated to temperatures sufficient to cause the components to react. Usually the reaction is carried out at temperatures in the range below 300° C. and preferably around 50–120° C. Lower temperatures can be employed to carry out the reaction, but inordinately long times are required for completion of the reaction. When the epoxy ingredient and the lactam are mixed and heated, the two components become miscible, the reaction starts and a hydroxy lactam derivative of the fatty material is formed as an intermediate. Further heating results in the opening of the lactam ring. The polyamine functions as an accelerator and also as a source for polyamino radicals to be incorporated into the polymer.

The lactam should be present in amounts of 1–20% based upon the epoxidized reactant and the preferred range is usually between about 4–14%. The amount of polyamine used in the adhesive will vary between 0.5% and 40% based on the weight of the epoxy compound. The preferred range is from 1% to 20%. Usually, however, between 50% to 95% of the total amine is added in conjunction with the solvent.

Normally, the shelf life of the adhesive is about 2 months. Pot life extenders can be mixed in to extend the workable life of the product. For example, trioxymethylene can be used as a viscosity stabilizer to prevent jelling for approximately six months. Other suitable stabilizers are paraformaldehyde, anhydrous formaldehyde and metaldehyde. The adhesive used to bond the nylon articles (either in the form of a sheet or part) is usually diluted with a solvent for easy application and may be applied in any conventional manner such as by brushing, spraying, dipping, etc. The solvent may vary between 50–500% of the weight of the epoxidized ingredient. The preferred range however is from 50–200%. Typical solvents include the acyclic and cyclic ethers of up to about 20 carbon atoms. Specific non-limiting examples include tetrahydrofuran, dioxane, diethyl ether, dibutyl ether and diisopropyl ether. In conjunction with the solvent, additional polyamine is added to catalyze the curing of the adhesive.

The following examples are presented to illustrate the invention. It will be understood that these examples are illustrative and should not be taken in any manner as limiting the invention as defined in the appended claims.

*Example I*

A mixture of 2,400 grams of epoxidized linseed oil (oxirane oxygen content 9.0%), 96 grams of caprolactam and 38.4 grams of triethylene tetramine was placed in a 5 liter round-bottomed flash equipped with a stirrer, thermometer and condenser and the mixture was agitated until uniform. The flask was evacuated by means of a bench vacuum and the mixture was heated at 150° C. for 2 hours. The vacuum was then released. At this point 28.8 grams of trioxymethylene was added with stirring. After all the trioxymethylene was dissolved, the reaction mixture was permitted to cool to room temperature. A mixture of 2,543 grams of tetrahydrofuran and 381 grams of triethylene tetramine was added and the entire mixture agitated until uniform. A thin coat (0.005 inch) of this adhesive was applied to both surfaces of a broken nylon meat hook. The coated surfaces were allowed to dry for one hour at room temperature. The broken pieces were then clamped together and baked overnight at 125° C. The resulting article had an adhesive bond strength comparable in strength to that of nylon itself.

Example II

A mixture of 500 grams of epoxidized linseed oil (oxirane oxygen content 9.1%), 40 grams of caprolactam and 7.68 grams of triethylene tetramine was placed in a 2 liter round-bottomed flask and mixed until uniform. The flask was evacuated with a bench vacuum and heated at 100° C. for about 2 hours. The vacuum was released and 5.76 grams of trioxymethylene was added. The mixture was stirred until the trioxymethylene was completely dissolved and the system was then cooled to room temperature. A mixture of 1,000 grams of tetrahydrofuran and 76 grams of triethylene tetramine was then added and the system mixed until uniform. The surface of two nylon articles was coated with the adhesive and allowed to stand until the odor of tetrahydrofuran was no longer noticeable. The articles were mated, pressed together and baked for 1 hour at 165° C.

Example III

A mixture of 510 grams of epoxidized linseed oil (oxirane oxygen content 9.7%), 70 grams of caprolactam and 8.0 grams of triethylene tetramine was weighed into a one liter flask and mixed until uniform. The flask was evacuated and the system heated at 105° C. for 1½ hours. The vacuum was released and 6.0 grams of trioxymethylene added with stirring. After the trioxymethylene was dissolved, the mixture was cooled to room temperature and a mixture of 255 grams of tetrahydrofuran and 75 grams of triethylene tetramine was added with agitation. A thin coating of this adhesive was added to the surfaces of a broken nylon gear wheel which was to be cemented. The parts were allowed to stand until the solvent had evaporated. Then the coated surfaces were mated, pressed together and baked for eight hours at 135° C. The resulting adhesive bond was comparable in strength to that of nylon itself.

Example IV 50 grams of butyrolactam was dissolved in 1,200 grams of epoxidized sardine oil (oxirane oxygen content 8.3%). 16 grams of tetraethylene pentamine was then added. The mixture was poured into a three liter round-bottomed flask equipped with a stirrer, thermometer and condenser. The flask was evacuated by means of a water aspirator. The mixture was then heated at 80° C. for five hours. The vacuum was released and 15 grams of trioxymethylene was added while stirring. After this dissolved, the mixture was cooled to room temperature. One liter of dioxane and 200 grams of tetraethylene pentamine were then added and the stirring was continued for an additional one-half hour. A thin coat of this adhesive was then applied to one side of a thin sheet of nylon and to one side of a 12 ply glass-cloth-polyester laminate. The coated surfaces were then allowed to dry until the odor of dioxane was no longer discernible. The nylon was then laminated to the polyester by clamping the adhesive coated surfaces together and baking overnight at 135° C. The resulting polyester-nylon laminate was then fabricated into an electrical switchboard.

Example V 250 grams of epoxidized menhaden oil (oxirane oxygen content 8.6%) was mixed with 49 grams of caprolactam and 6.5 grams of tetraethylene pentamine. The reaction vessel was evacuated with bench vacuum and heated at 100° C. for about 45 minutes. The vacuum was released and 4.9 grams of trioxymethylene was added. The mixture was agitated until homogeneous and then cooled to room temperature. A mixture of 800 grams of diethyl ether and 36 grams of tetraethylene pentamine was then added and the system mixed until uniform. The mating surfaces of the two halves of a nylon transistor radio case were then coated with this adhesive. The ether was allowed to evaporate and the surfaces were then clamped together and baked for one hour at 185° C.

Example VI 1020 grams of epoxidized linseed oil (oxirane oxygen content=8.0%) was mixed with 100 grams of the lactam of epsilon amino octanoic acid and 15 grams of triethylene tetramine. The mixture was placed in a two liter round-bottomed flask equipped with a stirrer, condenser and thermometer. The flask was evacuated and the system heated at 125° C. for 25 minutes. The vacuum was released and 12 grams of anhydrous formaldehyde gas was added with stirring. The mixture was cooled to room temperature and added to a mixture of 500 grams of diisopropyl ether and 150 grams of triethylene tetramine. Two nylon surfaces, which were to be cemented together, were coated with this adhesive. The solvent was allowed to evaporate. The surfaces were then clamped together and baked overnight at 130° C. The resulting bond was comparable in strength to that of the original nylon.

Example VII

A mixture of 800 grams of epoxidized menhaden oil (oxirane oxygen content 8.3%), 16 grams of butyrolactam, and 6 grams of triethylene tetramine was placed in a flask equipped with a stirrer, thermometer and condenser. The flask was evacuated and heated at 200° C. for one hour. The vacuum was then released and 4.2 grams of trioxymethylene was added with stirring. When the mixture became transparent it was cooled to room temperature. 450 grams of tetrahydrofuran and 10 grams of triethylene tetramine were than added and the mixture was stirred until uniform, two sheets of nylon were then cemented together by coating the surfaces to be mated with this adhesive, allowing the solvent to evaporate, clamping the surfaces together, and then baking at 190° C. for 48 hours.

Example VIII

A mixture of 1000 grams of epoxidized linseed oil (oxirane oxygen content 8.9%), 190 grams of caprolactam and 15 grams of diethylene triamine was placed in a glass reaction vessel equipped with an agitator, condenser and recording thermocouple. The flask was evacuated and heated at 100° C. for 8 hours. The vacuum was released and 10 grams of trioxymethylene added. The mixture was stirred until the cloudiness disappeared and then cooled to room temperature. A mixture of 4000 grams of dioxane and 150 grams of diethylene triamine was then added and mixed until uniform. The surfaces of two nylon articles to be cemented together were then coated with a thin layer of this adesive. They were then allowed to stand until they were substantially free from the odor of dioxane. Next they were clamped together and baked for four hours at 175° C.

Careful preparation of the adherent surfaces should be maintatined when maximum bonding strength is desired. The bonding areas should be free of oil, grease, moisture, etc. Depending upon the type of contaminant, the nylon surface can be cleaned by mechanical and/or chemical means. Wire brushing, sandblasting, sandpapering, steel wooling and other types of abrasion methods can be used to eliminate the contaminants. Certain organic contaminants such as greases or oils are best removed by chemical cleaning agents such as detergents and solvents. In any event, after the abrasing procedure, the surfaces should be treated with a solvent. For example, the nylon articles to be bonded can be prepared by sanding or steel wooling, followed by wiping with say ketones, such as acetone or methyl ethyl ketone. Where recontamination is a problem, the entire article should be washed in a detergent solution before sanding to reduce the possibility of recontamination of the surfaces to be bonded. Prior to wiping with a solvent, the dust formed by the abrasing procedure can be removed by a blower or other means. If steel wool is used, the particles can be removed by use of a magnet.

Prior to coating the nylon surfaces, the mating surfaces should be checked for proper clearance and uniform contact by holding them together with little pressure. The articles can then be coated by any of the conventional means such as by brushing, spraying, dipping, etc. However, the adhesive should be applied in such a way as to assure complete wetting of the surfaces to be bonded. Usually, the adhesive layer thickness will range from 0.0005–0.200 inch with 0.001 to 0.010 inch being preferred. In certain instances, the adhesive may be applied to one of the surfaces only. Usually, however, better results are obtained when both surfaces are coated prior to mating.

After the articles are coated, they are allowed to sit for a period of time so that the solvent can evaporate. Usually at least 90% of the solvent should be evaporated before mating. This time is usually about one hour when the solvent is tetrahydrofuran. The coated articles are then mated. If even distribution of the adhesive is desired, the articles can be moved gently against each other. This also helps to eliminate any entrapped air. Once the articles are properly aligned, they can be clamped together and the "squeeze-out" removed by wiping with a solvent.

The curing period depends upon the temperature and pressures at which the curing operation is carried out. As mentioned above, 50%–95% of the total amount of a polyamine is added in conjunction with the solvent to accelerate the cure. The curing temperature may vary from 50° C. to 210° C. with 100° C. to 165° C. being preferred. The pressure may vary from 1 to 1,000 p.s.i. At room temperature, the curing adhesive will set within 72 hours at which time the bonded articles can be safely handled. However, full bond strength is not developed until about 28 days. In cases where heat curing is desired, the bonded articles can be baked in a laboratory oven or under infrared lamps. In case of laminates, the temperature can be supplied by the laminating presses.

Of particular interest is the laminating of nylon sheets. In making the laminates, sheets of nylon and other plastics are coated with the adhesive and subjected to heat and pressure. Practically any plastic can be bonded to the nylon sheets to some degree. However, the polar type plastics give the best results. Examples of such plastics include fibrous glass (polyesters), polyvinyl halides, polyacrylates, polyvinyl acetate, polyvinylidene halides, rubber as well as copolymers such as polyvinylchloride-vinylidene and polyacryonitrile-butadiene-styrene. The resulting laminates can be used for functional purposes such as electrical switchboards or decorative purposes such as tabletops, counters, etc. Also, the laminates can be further machined and used in industry components such as gears and bearings.

It is apparent that many modifications and variations of the invention as hereinbefore set forth may be made without departing from the spirit and scope thereof. The specific embodiments described in the examples are given by way of illustration only and the invention is to be limited only by the terms of the appended claims.

We claim:

1. An article comprising a plurality of nylon segments bonded together by means of an adhesive phase, said adhesive phase comprising a polymeric resin formed by reacting 100 parts of a nonterminal-oxirane-containing fatty material having at least one 8–22 carbon chain and containing at least four oxirane groups per molecule, said material selected from the group consisting of oxirane substituted higher fatty acid esters, oxirane substituted higher alcohol esters, and oxirane substituted higher fatty acid amides of polyamines, with 1 to 20 parts of a lactam and 0.5 to 40 parts of a polyamine under temperature and time conditions sufficient to open the lactam ring.

2. The article of claim 1 wherein the polymeric resin is formed by reacting 100 parts of fatty material with 4 to 14 parts of lactam and 1 to 20 parts of polyamine.

3. The article of claim 1 wherein the fatty material is a glyceride ester of oxirane-substituted higher fatty acids and the lactam is caprolactam.

4. A multi-layer article capable of being machined, said article comprising at least one nylon layer and at least one adhesive layer comprising a polymeric resin formed by reacting a nonterminal-oxirane-containing fatty composition having at least one 8–22 carbon chain and containing at least four oxirane groups per molecule, said material selected from the group consisting of oxirane substituted higher fatty acid esters, oxirane substituted higher alcohol esters, and oxirane substituted higher fatty acid amides of polyamines, with 1 to 20 parts of a lactam and 0.5 to 40 parts of polyamine under temperature and time conditions sufficient to open the lactam ring.

5. The article of claim 4 wherein the polymeric resin is formed by reacting 100 parts of fatty material with 4 to 14 parts of lactam and 1 to 20 parts of polyamine.

6. The article of claim 4 wherein the oxirane-containing fatty composition is a glyceride ester of oxirane-substituted higher fatty acids and the lactam is caprolactam.

7. A plastic laminate having a base phase and an adhesive phase, said base phase comprising a nylon sheet and said adhesive phase comprising a polymeric resin formed by reacting a nonterminal-oxirane-containing fatty composition having at least one 8–22 carbon chain and containing at least four oxirane groups per molecule, said material selected from the group consisting of oxirane substituted higher fatty acid esters, oxirane substituted higher alcohol esters, and oxirane substituted higher fatty acid amides of polyamines, with 1 to 20 parts of a lactam and 0.5 to 40 parts of a polyamine under temperature and time conditions sufficient to open the lactam ring.

8. The laminate of claim 7 wherein the oxirane-containing fatty composition is formed by reacting 100 parts of fatty material with 4 to 14 parts of lactam and 1 to 20 parts of polyamine.

9. The laminate of claim 7 wherein the oxirane-containing fatty composition is a glyceride ester of oxirane-substituted higher fatty acids and the lactam is caprolactam.

10. The method of bonding nylon to nylon comprising coating at least one of the nylon surfaces to be bonded with a solvent solution of an adhesive comprising the reaction product of a nonterminal-oxirane-containing fatty substance having at least one 8–22 carbon chain and containing at least four oxirane groups per molecule, said material selected from the group consisting of oxirane substituted higher fatty acid esters, oxirane substituted higher alcohol esters, and oxirane substituted higher fatty acid amides of polyamines, with 1 to 20 parts of lactam and 0.5 to 40 parts of a polyamine under temperature and time conditions sufficient to open the lactam ring; allowing the solvent to partially evaporate; mating and pressing the nylon surfaces to be bonded; and curing the adhesive at a temperature below about 210° C.

11. The method of claim 10 wherein the oxirane-containing fatty substance is an epoxidized glyceride ester and the lactam is caprolactam.

12. The method of claim 11 wherein the curing temperature is from 100–165° C.

13. A synthetic laminate capable of being fabricated at a temperature of between 100° C. and 200° C. without appreciable weakening which comprises a plurality of superimposed sheets each of which has been coated with a heat curable resinous adhesive composition which results from reacting at temperatures sufficient to open a lactam ring, 100 parts of nonterminal-oxirane-containing triglyceride ester having at least one 8–22 carbon chain and containing at least 4 oxirane groups per molecule, 1 to 20 parts of a lactam and 0.5 to 40 parts of a polyamine, the whole assembly having been consolidated as integral unit by heat and pressure.

14. The laminate of claim 13 wherein the sheets are selected from the group of polar type plastics consisting of fibrous glass (polyesters), polyvinyl halides, polyacrylates, polyvinyl acetate, polyvinylidene halides, rubber and copolymers thereof.

References Cited by the Examiner

UNITED STATES PATENTS

| | | | |
|---|---|---|---|
| 2,643,239 | 6/1953 | Shokal | 161—184 X |
| 2,764,502 | 9/1956 | Emerson | 161—194 X |
| 2,825,672 | 3/1958 | Doblitz et al. | 161—184 X |
| 2,847,343 | 8/1958 | Kohn. | |
| 2,949,441 | 8/1960 | Newey | 161—184 X |

HAROLD ANSHER, *Primary Examiner.*

EARL M. BERGERT, *Examiner.*

L. T. PIRKEY, C. B. COSBY, *Assistant Examiners.*